US008825455B2

(12) United States Patent  (10) Patent No.: US 8,825,455 B2
Bittner et al.  (45) Date of Patent: Sep. 2, 2014

(54) ON-DEMAND TABLE MODEL FOR SEMICONDUCTOR DEVICE EVALUATION

(75) Inventors: Calvin J. Bittner, Saint Albans, VT (US); Peter Feldmann, New York, NY (US); Richard D. Kimmel, Wappingers Falls, NY (US); Tong Li, Austin, TX (US); Ali Sadigh, Irvine, CA (US); David W. Winston, Asheville, NC (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 13/289,589

(22) Filed: Nov. 4, 2011

(65) Prior Publication Data

US 2013/0116985 A1   May 9, 2013

(51) Int. Cl.
  *G06F 17/10* (2006.01)
  *G06F 17/17* (2006.01)

(52) U.S. Cl.
  CPC .................................. *G06F 17/175* (2013.01)
  USPC ............................................................ 703/2

(58) Field of Classification Search
  USPC ............................................................ 703/2
  See application file for complete search history.

(56) References Cited

U.S. PATENT DOCUMENTS

| | | | |
|---|---|---|---|
| 5,467,291 A | 11/1995 | Fan et al. | |
| 5,774,382 A | 6/1998 | Tyler et al. | |
| 6,625,785 B2 | 9/2003 | Chatterjee et al. | |
| 6,952,494 B2 | 10/2005 | Odagiri et al. | |
| 7,449,946 B1 | 11/2008 | Hoover | |
| 7,735,033 B2 | 6/2010 | Zhang et al. | |
| 2004/0186702 A1 | 9/2004 | Okamoto et al. | |
| 2008/0109204 A1 | 5/2008 | Zhang et al. | |

OTHER PUBLICATIONS

Thakker et al.; "Automated design and optimization of circuits in emerging technologies", Design Automation Conference, 2009. ASP-DAC 2009. Asia and South Pacific; pp. 504-509; 2009.*
Thakker et al. (1) Novel Table-Based Approach for Design of FinFET Circuits; IEEE Transactions on Computer-Aided Design of Integrated Circuits and Systems, vol. 28, No. 7; pp. 1061-1070; 2009.*
Kanj et al. "Accelerated statistical simulation via on-demand Hermite spline interpolations"; Computer-Aided Design (ICCAD), 2011 IEEE/ACM International Conference on, pp. 353-360; 2011.*
"Polynomial" obtained from h##p://en.wikipedia.org/wiki/Polynomial on Sep. 30, 2013; Sep. 25, 2013; 16 pages.*
Shima et al.; Table Look-Up MOSFET Modeling System Using a 2-D Device Simulator and Monotonic Piecewise Cubic Interpolation; IEEE Transactions on Computer-Aided Design of Integrated Circuits and Systems, vol. CAD-2, No. 2, Apr. 1983; pp. 121-126.*

(Continued)

*Primary Examiner* — Hugh Jones
(74) *Attorney, Agent, or Firm* — David Cain; Roberts Mlotkowski Safran & Cole, P.C.

(57) ABSTRACT

An on-demand table model for semiconductor device evaluation is provided. A method of providing on-demand table models for semiconductor device evaluation, includes measuring one or more measurement values of an instance of a semiconductor device. The method further includes providing, by a processor, a table model of the instance for the semiconductor device evaluation upon receiving a request for the semiconductor device evaluation. The method further includes generating a table entry in the table model for the one or more measurement values, the table entry including one or more evaluation values of an evaluation function for the instance.

17 Claims, 7 Drawing Sheets

(56) References Cited

OTHER PUBLICATIONS

Allen et al.; "A table look-up MOSFET model for analog applications," Computer-Aided Design, 1988. ICCAD-88. Digest of Technical Papers., IEEE International Conference on , vol., No., pp. 124-127; 1988.*
Lewis: Device Model Approximation Using 2 Trees; IEEE Transactions on Computer-Aided Design. vol. 9, No. I; 1990; pp. 30-38.*
Cho et al.; A Table Look.up Model Using a 3•D Isoparametric Shape Function with Improved Convergency; Computer-Aided Design, 1989. ICCAD-89. IEEE; 1989; pp. 244-247.*
Fang et al.; Fast, Accurate MOS Table Model for Circuit Simulation' Using an Unstructured Grid and Preserving Monotonicity; ASP-DAC 2005; pp. 1102-1106.*
Cao et al. "A new method for accurate analytical modeling of switched reluctance motor," Power Electronic Drives and Energy Systems for Industrial Growth, 1998. Proceedings. 1998 International Conference; pp. 540,545 vol. 2; 1998.*
Barby, J.A. et al., "Polynomial Splines for MOSFET Model Approximation", IEEE Transactions on Computer-Aided Design, May 1988, pp. 557-566, vol. 7, No. 5.
Kimura, Mutsumi et al., "Table Look-Up Model of Thin-Film Transistors for Circuit Simulation Using Spline Interpolation With Transformation by y=x+log(x)", IEEE Transactions on Computer-Aided Design of Integrated Circuits and Systems, Sep. 2002, pp. 1101-1104, vol. 21, No. 9.
Rofougaran, A.R. et al., "Accurate Analog Modeling of Short Channel FETs based on Table Lookup", Custom Integrated Circuits Conference, Proceedings of the IEEE 1988, 1988, pp. 413-416.
Yoon, Kwang S. et al., "An Adjustable Accuracy Model for VLSI Analog Circuits Using Lookup Tables", Analog Integrated Circuits and Signal Processing, 1991, pp. 45-63, vol. 1, No. 1 (Abstract only), (only abstract considered).
Allen, P.E. et al., "A table look-up MOSFET model for analog applications", Computer-Aided Design, ICCAD-88, Digest of Technical Papers., IEEE International Conference on . . . , Nov. 7-10, 1988, pp. 124-127 (Abstract only), (only abstract considered).
Graham, M.G. et al., "Template-based MOSFET device model", Computer-Aided Design of Integrated Circuits and Systems, IEEE Transactions on . . . , Aug. 1995, pp. 924-933, vol. 14, Issue 8 (Abstract only), (only abstract considered).
Yanilmaz, M. et al., "Numerical device modeling for electronic circuit simulation", Computer-Aided Design of Integrated Circuits and Systems, IEEE Transactions on . . . , Mar. 1991, pp. 366-375, vol. 10, Issue 3 (Abstract only), (only abstract considered).
Tang, Qin et al., "Transistor-Level Waveform Evaluation for Timing Analysis", Circuits and Systems Group, Delft University of Technology, 2010, 6 pages.
Collantes, J.M. et al., "New measurement-based technique for RF LDMOS nonlinear modeling", Microwave and Guided Wave Letters, IEEE, Oct. 1998, pp. 345-347, vol. 8, Issue 10 (Abstract only), (only abstract considered).
Angelov, I . et al., "An empirical table-based FET model", Microwave Theory and Techniques, IEEE Transaction on . . . , Dec. 1999, pp. 2350-2357, vol. 47, Issue 12 (Abstract only), (only abstract considered).
Cao, S. et al., "A new method for accurate analytical modeling of switched reluctance motor", Power Electronic Drives and Energy Systems for Industrial Growth, 1998 Proceedings, 1998 International Conference on . . . , Dec. 1-3, 1998, pp. 540-545, vol. 2 (Abstract only), (only abstract considered).
Coughran, Jr., W.M. et al., "Extracting transistor changes from device simulations by gradient fitting", Computer-Aided Design of Integrated Circuits and Systems, IEEE Transactions on . . . , Apr. 1989, pp. 380-394, vol. 8, Issue 4 (Abstract only), (only abstract considered).
Shima, T. et al., "Table Look-Up MOSFET Modeling System Using a 2-D Device Simulator and Monotonic Piecewise Cubic Interpolation", Computer-Aided Design of Integrated Circuits and Systems, IEEE Transactions on . . . , Apr. 1983, pp. 121-126, vol. 2, Issue 2 (Abstract only), (only abstract considered).
Shima, T. et al., "Three-dimensional table look-up MOSFET model for precise circuit simulation", Solid-State Circuits, IEEE Journal of . . . , Jun. 1982, pp. 449-454, vol. 17, Issue 3 (Abstract only), (only abstract considered).
Shima, T., "Table Lookup MOSFET Capacitance Model for Short-Channel Devices", Computer-Aided Design of Integrated Circuits and Systems, IEEE Transactions on . . . , Oct. 1986, pp. 624-632, vol. 5, Issue 4 (Abstract only), (only abstract considered).
Graham, M.G. et al., "Compact table-based MOSFET model", University/Government/Industry Microelectronics Symposium, 1993, Proceeding of the Tenth Biennial . . . , May 18-19, 1993, pp. 137-140 (Abstract only), (only abstract considered).
Abuelmaatti, A. et al., "Linearization of table-based MOSFET Model parameters for nonlinear quantification", Circuits and Systems, 2008, APCCAS 2008, IEEE Asia Pacific Conference on . . . , Nov. 30, 2008-Dec. 3, 2008, pp. 1608-1611 (Abstract only), (only abstract considered).
Yang, Hua-Zhong et al., "MOS transistor model and fast timing simulator", Electronics Letters, Apr. 1, 1999, pp. 561-563, vol. 35, Issue 7 (Abstract only), (only abstract considered).
Cheng, C.W. et al. "A fast method for MOS model evaluation in VLSI simulation with controllable error", Circuits and Systems, 1991, Conference Proceedings, China, 1991 International Conference on . . . , Jun. 16-17, 1991, pp. 200-203, vol. 1 (Abstract only), (only abstract considered).

\* cited by examiner

ON-DEMAND TABLE MODEL FOR SEMICONDUCTOR DEVICE EVALUATION

FIELD OF THE INVENTION

The invention relates to semiconductor devices and methods of evaluation and, more particularly, to an on-demand table model for semiconductor device evaluation.

BACKGROUND

To evaluate semiconductor device models, there are several known processes. For example, in a process using linear table models, multi-dimensional grids can be populated with measurement (e.g., currents and/or charges as functions of terminal voltages) values of semiconductor device models. Linear interpolation may then be utilized to generate, e.g., current and/or charge values for a circuit simulator which needs device evaluations during its operation. In another example, higher order polynomial function table models may be used that rely on multiple grid points from neighboring regions to build and solve polynomial equations representing, e.g., the current and/or charge values.

However, the known processes for semiconductor device evaluation include several issues. For example, in the linear table model process, when the linear interpolation generates a first order derivative, the resulting current and/or charge values may not be continuous across boundaries of the multi-dimensional grids. This lack of continuity across the boundaries causes simulation difficulties for the circuit simulator. In the higher order polynomial function table model process, a non-uniform grid including a high amount of sample points may be required that is costly to generate and manage to ensure that the polynomial equations and their derivatives follow the measurement data closely. For all known processes, a circuit simulator's knowledge of evaluation equations may also be required, and may have to be set and inflexible for evaluation. In addition, the known processes may consume an exorbitant amount of memory and/or processing capabilities during evaluation due to the complexity of the higher order polynomial function table models.

Accordingly, there exists a need in the art to overcome the deficiencies and limitations described hereinabove.

SUMMARY

In a first aspect of the invention, a method of providing on-demand table models for semiconductor device evaluation, includes measuring one or more measurement values of an instance of a semiconductor device. The method further includes providing, by a processor, a table model of the instance for the semiconductor device evaluation upon measurement of the one or more measurement values. The method further includes generating a table entry in the table model for the one or more measurement values, the table entry including one or more evaluation values of an evaluation function for the instance.

In another aspect of the invention, a computer program product includes a tangible computer usable storage medium having readable program code embodied in the tangible computer usable storage medium. The computer program product further includes at least one component operable to measure one or more measurement values of an instance of a semiconductor device. The at least one component is further operable to provide a table model of the instance for semiconductor device evaluation upon receiving a request for the semiconductor device evaluation. The at least one component is further operable to generate a table entry in the table model for the one or more measurement values, the table entry including one or more evaluation values of an evaluation function for the instance.

In yet another aspect of the invention, a method for semiconductor device evaluation, includes measuring one or more measurement values of an instance of a semiconductor device. The method further includes at least one of retrieving and generating, by a processor, a table model of the instance for the semiconductor device evaluation upon receiving a request for the semiconductor device evaluation based on whether the table model is assigned to the instance. The method further includes generating a table entry in the table model for the one or more measurement values, the table entry including a plurality of coefficients of a Hermite spline function for the instance.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
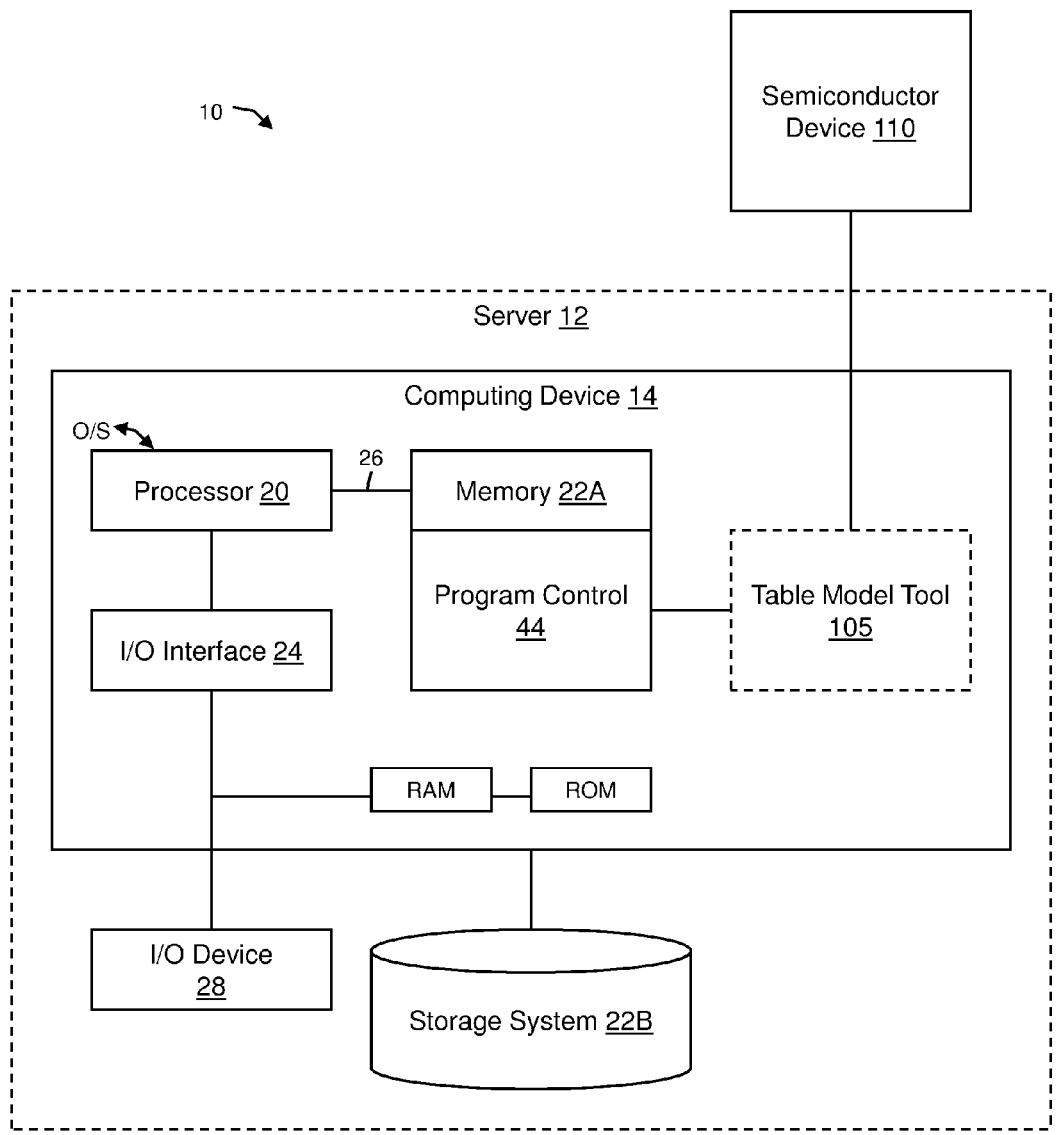
FIG. 1 is an exemplary environment for implementing the steps in accordance with aspects of the invention.

The invention relates to semiconductor structures and methods of evaluation and, more particularly, to an on-demand table model for semiconductor device evaluation. More specifically, the present invention includes a table model tool for providing on-demand table models for semiconductor device evaluation or simulation when they are needed during the semiconductor device evaluation or simulation. The table model tool further provides continuous evaluation function values for the table models using a Hermite spline function which requires only information local to a certain measurement point in the table models.

In embodiments, the table model tool can measure or receive a plurality of measurement values (e.g., voltages) of a known particular instance (e.g., type) of a semiconductor device. For example, the semiconductor device may include a metal-oxide-semiconductor field-effect transistor (MOSFET) of n- or p-type, a n-type field effect transistor (nFET), a p-type field effect transistor (pFET), and/or other types of semiconductor devices. The measurement values of the instance of the semiconductor device may include, for example, a source-to-bulk voltage $v_{sb}$, a gate-to-bulk voltage $v_{gb}$, and drain-to-bulk voltage $v_{db}$, of a specific type of a MOSFET. Upon request for an evaluation of a table model of an instance of the semiconductor device, the table model tool may provide (e.g., retrieve or generate) the on-demand table model of the instance of the semiconductor device. The table model may include a multi-dimensional (e.g., three-dimensional) grid of previously-measured measurement points of the instance of the semiconductor device. For example, each of the measurement points may include a plurality of measurement values of the instance of the semiconductor device, such as voltages $v_{sb}$, $v_{gb}$, $v_{db}$ of a specific type of a MOSFET. For each of the measurement points (e.g., ($v_{sb}$, $v_{gb}$, $v_{db}$)), the table model may include a corresponding table entry which includes a plurality of generated evaluation values (e.g., coefficients, currents, and/or charges) of an evaluation function (e.g., the Hermite spline function) for the instance of the semiconductor device.

In accordance with further aspects of the invention, when, in the table model, a corresponding table entry does not exist for the currently-measured measurement values of the instance of the semiconductor device, the table model tool can generate a table entry for the currently-measured measurement values. For example, the table model tool may generate a plurality of evaluation values (e.g., coefficients, currents, and/or charges) of an evaluation function (e.g., the Hermite spline function) based on the currently-measured measurement values, values local to the measurement values, and nonlinear equations related to the evaluation function. Based on the table model, the table model tool may evaluate the instance of the semiconductor device, e.g., determine and evaluate resulting values of the evaluation function for one or more of the measurement points to determine a quality of and/or simulate the instance of the semiconductor device.

Advantageously, the use of on-demand table models of the present invention reduces memory consumption by generating and saving table models only when they are needed for semiconductor device evaluation, instead of requiring predetermined models for all potential measurement values. Since the table models may have less measurement and evaluation values than traditional models, the table models may be easier to manage and manipulate, and may thus, result in optimal processing efficiency. The table models are further saved for later use, which allows the table model tool to bypass some of the difficult computations of the table models and thereby further increase processing efficiency.

In addition, the use of the Hermite spline function of the present invention provides fast evaluation of semiconductor devices with only a set of local measurement values while maintaining accuracy equivalent to traditional evaluation models, such as the Berkley Short-channel IGFET Model (BSIM). The Hermite spline function also allows for continuity of evaluation functions at cross-grid boundaries of the multi-dimensional measurement values, and for monotonicity (e.g., no artifacts) through the boundaries. Even further, the Hermite spline function and its resulting values may be determined independent of any predetermined evaluation function, making it flexible for storing and adapting to any various evaluation functions.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In embodiments, the server 12 may include any mobile computing device, such as a mobile phone, a laptop, a video camera, etc. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with an external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handset, keyboard, etc.

In general, the processor 20 executes computer program code (e.g., program control 44), which can be stored in the memory 22A and/or storage system 22B. Moreover, in accordance with aspects of the invention, the program control 44 controls a table model tool 105, e.g., the processes described herein. The table model tool 105 can be implemented as one or more program code in the program control 44 stored in memory 22A as separate or combined modules. Additionally, the table model tool 105 may be implemented as separate dedicated processors or a single or several processors to provide the function of this tool. Moreover, it should be understood by those of ordinary skill in the art that the table model tool 105 is used as a general descriptive term for providing the features and/or functions of the present invention.

While executing the computer program code, the processor 20 can read and/or write data to/from memory 22A, storage system 22B, and/or I/O interface 24. The program code executes the processes of the invention, for example, functions of the table model tool 105, e.g., provide an on-demand table model for semiconductor device evaluation, using a Hermite spline function. The bus 26 provides a communications link between each of the components in the computing device 14.

In embodiments, the table model tool 105 can measure or receive a plurality of measurement values (e.g., voltages) of a known particular instance of a semiconductor device 110. For example, the semiconductor device 110 may include a metal-oxide-semiconductor field-effect transistor (MOSFET) of n- or p-type, a n-type field effect transistor (nFET), a p-type field effect transistor (pFET), and/or other types of semiconductor devices. The instance of the semiconductor device 110 may include a specific type of the semiconductor device 110 that can be represented by, e.g., a model name, a temperature, a corner or family name (e.g., MOSFET), and/or other instance parameters (e.g., a length, a width, etc.), of the semiconductor device 110. The measurement values of the instance of the semiconductor device 110 may include, for example, a source-to-bulk voltage $v_{sb}$, a gate-to-bulk voltage $v_{gb}$, and drain-to-bulk voltage $v_{db}$, of a specific type of a MOSFET.

In accordance with further aspects of the invention, upon receiving a request from a user for semiconductor device evaluation, the table model tool 105 can provide (e.g., retrieve or generate) an on-demand table model of the instance of the semiconductor device 110. In embodiments, the table model may include a multi-dimensional (e.g., three-dimensional) grid of previously-measured measurement points of the instance of the semiconductor device 110. For example, each of the measurement points may include a plurality of measurement values of the instance of the semiconductor device 110, such as voltages $v_{sb}$, $v_{gb}$, $v_{db}$ of a specific type of a MOSFET. For each of the measurement points (e.g., ($v_{sb}$, $v_{gb}$, $v_{db}$)), the table model may include a corresponding table entry which includes a plurality of generated evaluation values (e.g., coefficients, a drain-to-source current $I_{ds}$, a drain-to-bulk current $I_{db}$, and/or a charge $Q_{db}$) of an evaluation function (e.g., a Hermite spline function) for the instance of the semiconductor device 110. The table model tool 105 may either retrieve or generate the table model for the instance of the semiconductor device 110 based on whether a table model is assigned to (e.g., was previously-generated and stored for) the instance.

In embodiments, when, in the table model, a corresponding table entry does not exist for the currently-measured measurement values of the instance of the semiconductor device 110, the table model tool 105 can generate a table entry for the currently-measured measurement values. For example, the table model tool 105 can generate a plurality of evaluation values (e.g., coefficients, currents $I_{ds}$ and $I_{db}$, and/or a charge $Q_{db}$) of an evaluation function (e.g., a Hermite spline function) based on the currently-measured measurement values, local cubic values, and nonlinear equations, as described below. The table model tool 105 may store and/or update the generated evaluation values for later use in the table model which may be stored in, for example, the memory 22A and/or the storage system 22B. Based on the table model, the table model tool 105 can evaluate the instance of the semiconductor device 110, e.g., determine and evaluate resulting values of the evaluation function for one or more of the measurement points to determine a quality of and/or simulate the instance of the semiconductor device 110. If a generated table model causes a problem (e.g., an error, erroneous values, etc.) during semiconductor device evaluation and/or circuit simulation, the table model tool 105 may be instructed by a user to switch to a different type of analytical model (e.g., the original semiconductor model).

Advantageously, the table model tool 105 generates and stores table models, table entries, and/or evaluation values for values measured and to be evaluated in a semiconductor device, does not generate and store redundant table models, table entries, and/or evaluation values which are not used. Accordingly, use of the table model tool 105 decreases memory usage and increases processing performance in comparison to the known art. Further, by using cubic values local to measurement values of a semiconductor device to determine evaluation values of an evaluation function (e.g., a Hermite spline function), the table model tool 105 provides continuity of the evaluation values and function in a manageable table model. In addition, the table model tool 105 may be adapted for various instances or types of semiconductor devices.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
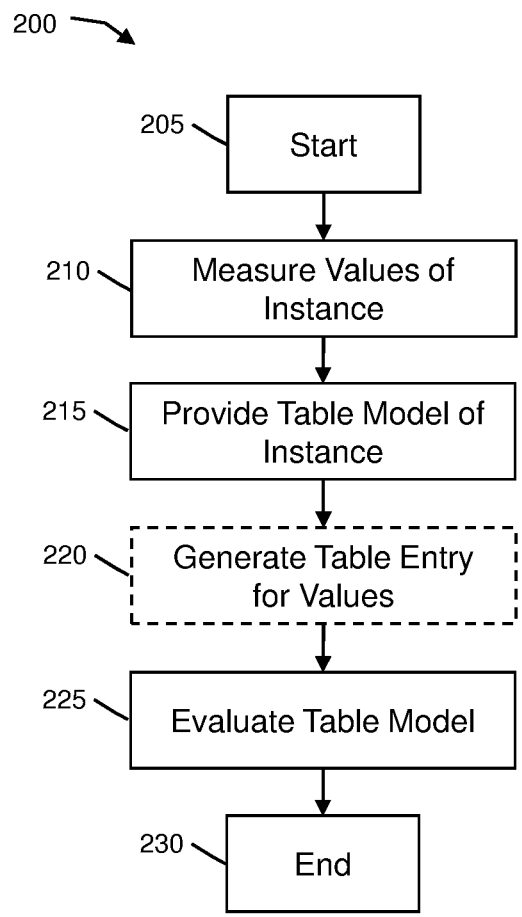
FIGS. 2-3 are exemplary flow diagrams of processes of providing on-demand table models for semiconductor device evaluation in accordance with aspects of the invention.
Figure 3:
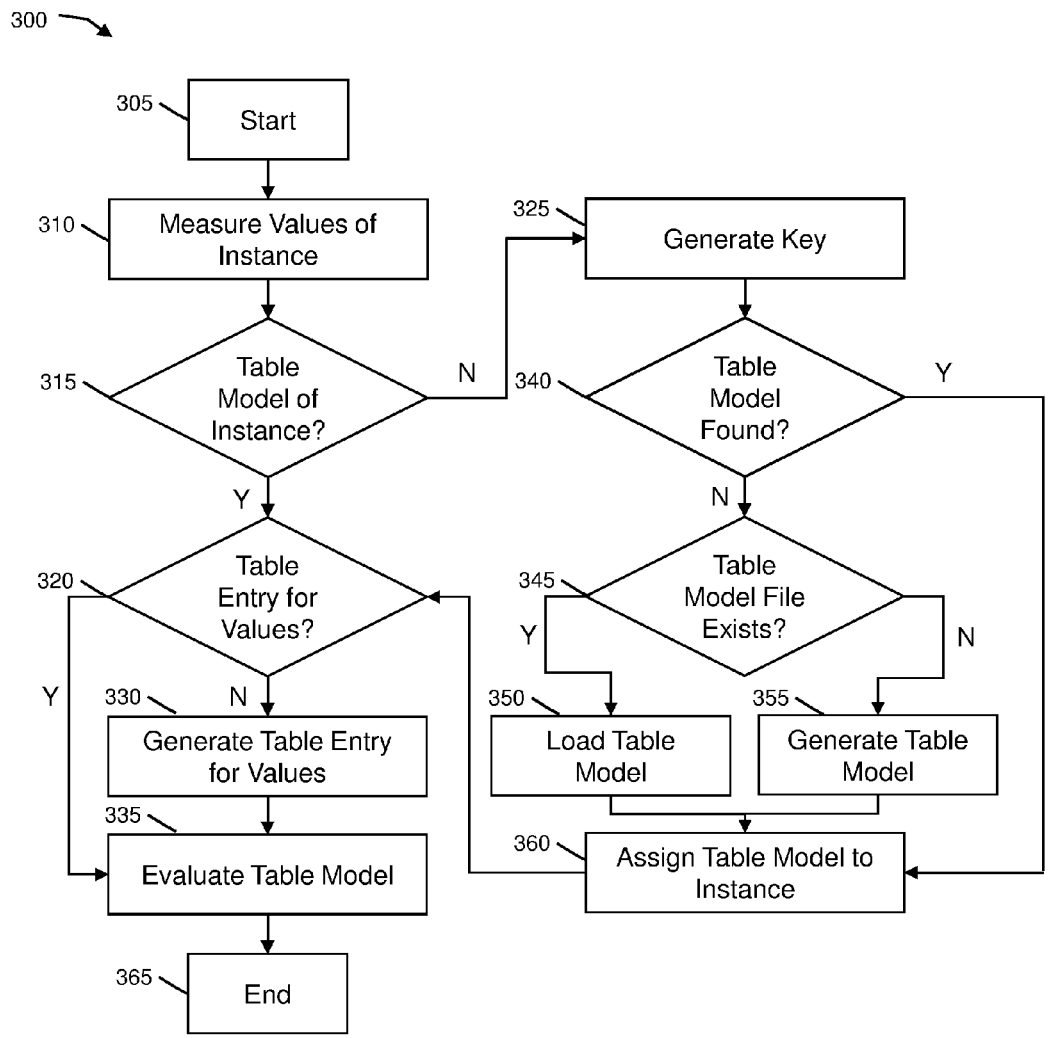

FIGS. 2-3 show an exemplary flow for performing aspects of the present invention. The steps of FIGS. 2-3 may be implemented in the environment of FIG. 1, for example. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 2 depicts an exemplary flow for a process 200 of providing on-demand table models for semiconductor device evaluation in accordance with aspects of the invention. In embodiments, the process 200 can be performed by the table model tool 105 in FIG. 1. At step 205, the process starts. At step 210, the table model tool measures or receives a plurality of measurement values (e.g., voltages) of a known particular instance of a semiconductor device (e.g., the semiconductor device 110 in FIG. 1). For example, the semiconductor device 110 can include a metal-oxide-semiconductor field-effect transistor (MOSFET) of either type, a n-type field effect transistor (nFET), a p-type field effect transistor (pFET), and/or other types of semiconductor devices. The measurement values of the instance of the semiconductor device may include, for example, a source-to-bulk voltage $v_{sb}$, a gate-to-bulk voltage $v_{gb}$, and drain-to-bulk voltage $v_{db}$, of a specific type of a MOSFET.

At step 215, upon receiving a request for semiconductor device evaluation from a user, the table model tool provides (e.g., retrieve or generate) an on-demand table model of the instance of the semiconductor device. In embodiments, the table model can include a multi-dimensional (e.g., three-dimensional) grid of previously-measured measurement points of the instance of the semiconductor device. For example, each of the measurement points may include a plurality of measurement values of the instance of the semiconductor device, such as voltages $v_{sb}$, $v_{gb}$, $v_{db}$ of a specific type of a MOSFET. For each of the measurement points (e.g., $(v_{sb}, v_{gb}, v_{db})$), the table model may include a corresponding table entry which includes a plurality of generated evaluation values (e.g., coefficients, currents $I_{ds}$ and $I_{db}$, and/or a charge $Q_{db}$) of an evaluation function (e.g., a Hermite spline function) for the instance of the semiconductor device. The table model tool may either retrieve or generate the table model for the instance of the semiconductor device based on whether a table model is assigned to (e.g., was previously-generated and stored for) the instance.

At step 220, when, in the table model, a corresponding table entry does not exist for the currently-measured measurement values of the instance of the semiconductor device, the table model tool generates a table entry for the currently-measured measurement values. In embodiments, the table model tool can generate a plurality of evaluation values (e.g., coefficients, currents $I_{ds}$ and $I_{db}$, and/or a charge $Q_{db}$) of an evaluation function (e.g., a Hermite spline function) based on the currently-measured measurement values, local cubic values, and nonlinear equations, as described below. At step 225, based on the table model, the table model tool evaluates the instance of the semiconductor device, e.g., determine and evaluate resulting values of the evaluation function for one or more of the measurement points to determine a quality of and/or simulate the instance of the semiconductor device. At step 230, the process ends.

FIG. 3 depicts an exemplary flow for a process 300 of providing on-demand table models for semiconductor device evaluation in accordance with aspects of the invention. In embodiments, the process 300 can be performed by the table model tool 105 in FIG. 1. At step 305, the process starts. At step 310, the table model tool measures a plurality of measurement values (e.g., voltages) of a known particular instance of a semiconductor device (e.g., the semiconductor device 110 in FIG. 1). For example, the semiconductor device 110 can include a metal-oxide-semiconductor field-effect transistor (MOSFET) of either type, a n-type field effect transistor (nFET), a p-type field effect transistor (pFET), and/or other types of semiconductor devices. The measurement values of the instance of the semiconductor device may include, for example, a source-to-bulk voltage $v_{sb}$, a gate-to-bulk voltage $v_{gb}$, and drain-to-bulk voltage $v_{db}$, of a specific type of a MOSFET.

At step 315, upon receiving a request for semiconductor device evaluation from a user, the table model tool determines whether an on-demand table model is assigned to the particular instance of the semiconductor device. In embodiments, the table model can include a multi-dimensional (e.g., three-dimensional) grid of previously-measured measurement points of the instance of the semiconductor device. For example, each of the measurement points may include a plurality of measurement values of the instance of the semiconductor device, such as voltages $v_{sb}$, $v_{gb}$, $v_{db}$ of a specific type of a MOSFET. For each of the measurement points (e.g., $(v_{sb}, v_{gb}, v_{db})$), the table model may include a corresponding table entry which includes a plurality of generated evaluation values (e.g., coefficients, currents $I_{ds}$ and $I_{db}$, and/or a charge $Q_{db}$) of an evaluation function (e.g., a Hermite spline function) for the instance of the semiconductor device. If a table model is assigned to the instance of the semiconductor device, then the process continues at step 320. Otherwise, the process continues at step 325.

At step 320, the table model tool determines whether, in the table model assigned to the instance of the semiconductor device, a corresponding table entry exists for the currently-measured measurement values of the instance of the semiconductor device. If the table entry exists for the currently-measured measurement values, then the process continues at step 335. Otherwise, the process continues at step 330.

At step 330, the table model tool generates a table entry for the currently-measured measurement values. In embodiments, the table model tool can generate a plurality of evaluation values (e.g., coefficients, currents $I_{ds}$ and $I_{db}$, and/or a charge $Q_{db}$) of an evaluation function (e.g., a Hermite spline function) based on the currently-measured measurement values, local cubic values, and nonlinear equations, as described below. At step 335, based on the table model, the table model tool evaluates the instance of the semiconductor device, e.g., determine and evaluate resulting values of the evaluation function for one or more of the measurement points to determine a quality of and/or simulate the instance of the semiconductor device.

At step 325, the table model tool generates a key based on the instance of the semiconductor device. In embodiments, the instance of the semiconductor device may include a specific type of the semiconductor device that can be represented by, e.g., a model name, a temperature, a corner or family name (e.g., MOSFET), and/or other instance parameters (e.g., a length, a width, etc.), of the semiconductor device. The key may be generated based on the type of the semiconductor device, to find a stored table model assigned to another instance of a semiconductor device that includes the same type of semiconductor device. Such a table model may be subsequently assigned to the instance of the semiconductor device. That is, a table model may be assigned to a plurality of instances of semiconductor devices which are similar in type, e.g., MOSFETs.

At step 340, the table model tool determines whether the stored table model assigned to another instance of a semiconductor device is found based on the generated key. If such a table model is found, the process continues at step 360. Otherwise, the process continues at step 345.

At step 345, the table model tool determines whether a table model file exists in memory and/or a storage system, e.g., the memory 22A and/or the storage system 22B in FIG. 1. In embodiments, the table model file can include a predetermined table model which may be initially assigned to an instance of a semiconductor device without a table model already assigned. The predetermined table model may include predetermined measurement (e.g., voltage) values and evaluation (e.g., Hermite spline coefficient, current $I_{ds}$ and $I_{db}$, and/or a charge $Q_{db}$) values, or may be unpopulated with values. If the table model file exists, the process continues at step 350. Otherwise, the process continues at step 355.

At step 350, the table model tool loads or retrieves a table model from the table model file in the memory and/or the storage system. At step 355, the table model generates or creates a table model. In embodiments, the generated table model may include predetermined measurement (e.g., voltage) values and evaluation (e.g., Hermit spline coefficient, current $I_{ds}$ and $I_{db}$, and/or a charge $Q_{db}$) values, or may be unpopulated with values. At step 360, the table model tool assigns the found table model based on the generated key, the loaded table model from the table model file, and/or the generated table model to the instance of the semiconductor device. The process continues at step 320. At step 365, the process ends.

Figure 4:
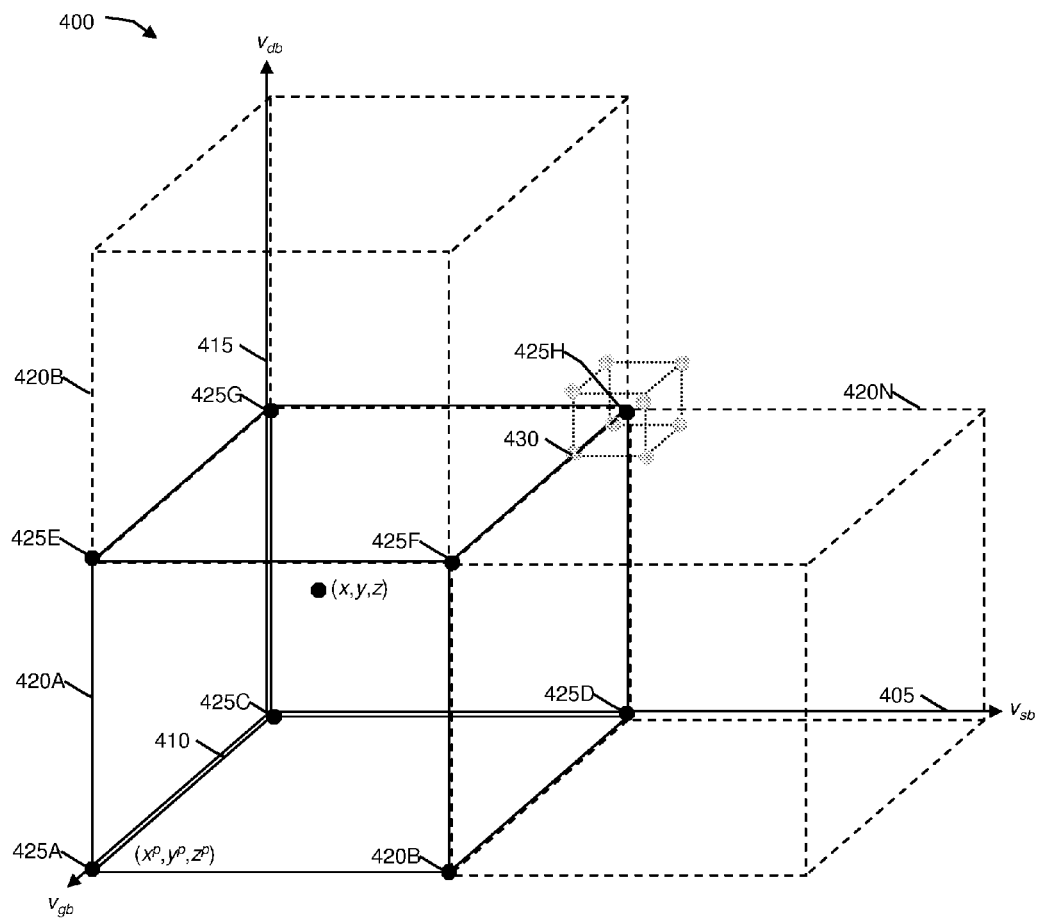
FIG. 4 is an exemplary grid of semiconductor voltages for which a table model for semiconductor device evaluation is provided in accordance with aspects of the invention.

FIG. 4 is an exemplary grid 400 of semiconductor voltages for which a table model for semiconductor device evaluation is provided in accordance with aspects of the invention. In embodiments, the grid 400 can be for (e.g., assigned to) one or more instances of semiconductor devices of similar type (e.g., MOSFETs). The grid 400 may include a multi-dimensional (e.g., three-dimensional) grid with, for example, a first axis 405 of source-to-bulk voltages $v_{sb}$, a second axis 410 of gate-to-bulk voltages $v_{gb}$, and a third axis 415 of drain-to-bulk voltages $v_{db}$, of MOSFETs. The grid 400 may further include previously-measured measurement points (e.g., (x,y,z)) of the instances of the semiconductor devices. For example, each of the measurement points may include a plurality of measurement values of the instances of the semiconductor devices, such as the voltages $v_{sb}$, $v_{gb}$, $v_{db}$. In addition, the grid 400 may include a plurality of cuboids 420A, 420B, and 420N which are predetermined regions of the multi-dimensional grid.

In embodiments, for each of the measurement points (e.g., (x,y,z)), a table model for the instance of the semiconductor device can include a corresponding table entry which includes a plurality of generated evaluation values (e.g., coefficients, currents $I_{ds}$ and $I_{db}$, and/or a charge $Q_{db}$) of an evaluation function (e.g., a Hermite spline function) for the instances of the semiconductor devices. To generate a table entry for a measurement point (x,y,z), for example, a table model tool (e.g., the table model tool 105 in FIG. 1) may determine that the measurement point (x,y,z) is located within the cuboid 420A. This may be represented by the following inequalities:

$$x_j^l < x < x_j^h, y_j^l < y < y_j^h, z_j^l < z < z_j^h \qquad (1),$$

where j represents a jth cuboid or the cuboid 420A, l represents a first vertex value of the jth cuboid along a x, y, or z axis, and h represents a second vertex value along the x, y, or z axis.

In accordance with further aspects of the invention, the table model tool can load or retrieve from memory (e.g., the memory 22A and/or the storage system 22B in FIG. 1) a structure of the cuboid 420A. In embodiments, the structure of the cuboid 420A may include vertex values of vertices 425A, 425B, 425C, 425D, 425E, 425F, 425G, and 425H of the cuboid 420A. For example, the vertex 425A may include the vertex values of $(x_j^l, y_j^l, z_j^l)$. Based on the vertex values, the table model tool may determine evaluation values of a Hermite spline function (e.g., a third-order polynomial function) which represents an evaluation function for a semiconductor device (e.g., a function for determining charge of the semiconductor device). For example, an evaluation function g(x,y,z) may be represented by a Hermite spline function ƒ(x,y,z) as follows:

$$g(x, y, z) \sim f(x, y, z) = \sum_{i=0}^{i<4}\sum_{j=0}^{j<4}\sum_{k=0}^{k<4} C_{ijk} x^i y^j z^k, \qquad (2)$$

where C represents a coefficient (e.g., an evaluation value) of the Hermite spline function ƒ(x,y,z).

In embodiments, the sixty-four (64) coefficients $C_{ijk}$ of the Hermite spline function ƒ(x,y,z) can be determined based on the vertex values of the cuboid 420A. More specifically, for each of the eight (8) vertices 425A, 425B, 425C, 425D, 425E, 425F, 425G, 425H of the cuboid 420A, the table model tool may determine eight (8) coefficients C of the Hermite spline function ƒ(x,y,z) based on the following equations ((3) to (10)):

For each vertex $(x_j^p, y_j^p, z_j^p)$, where p∈[l, h], $$C_1 = g(x_j^p, y_j^p, z_j^p) \qquad (3);$$

$$C_2 = dg/dx(x_j^p, y_j^p, z_j^p) \qquad (4);$$

$$C_3 = dg/dy(x_j^p, y_j^p, z_j^p) \qquad (5);$$

$$C_4 = dg/dz(x_j^p, y_j^p, z_j^p) \qquad (6);$$

$$C_5 = dg^2/dxdy(x_j^p, y_j^p, z_j^p) \qquad (7);$$

$$C_6 = dg^2/dxdz(x_j^p, y_j^p, z_j^p) \qquad (8);$$

$$C_7 = dg^2/dydz(x_j^p, y_j^p, z_j^p) \qquad (9); \text{ and}$$

$$C_8 = dg^3/dxdydz(x_j^p, y_j^p, z_j^p) \qquad (10).$$

In accordance with further aspects of the invention, to determine the higher order derivative values (e.g., dg3/dxdydz($x_j^p$, $y_j^p$, $z_j^p$)), a perturbed vertex ($x_j^p$−Δx, $y_j^p$−Δy, $z_j^p$−Δz) (e.g., a vertex 430) may be used instead of the vertex ($x_j^p$, $y_j^p$, $z_j^p$). Once the coefficients $C_{ijk}$ of the Hermite spline function ƒ(x,y,z) are determined, the table model tool may store the coefficients $C_{ijk}$ in memory as the evaluations values in the table entry for the instances of the semiconductor devices. Accordingly, these evaluation values of the table model may be subsequently retrieved and assigned to similar instances of the semiconductor devices, and may be used for semiconductor device evaluation, e.g., to determine currents $I_{ds}$ and $I_{db}$ and/or a charge $Q_{db}$. For example, during semiconductor device evaluation, a circuit simulator may load or retrieve the stored coefficients $C_{ijk}$ from memory and/or the table model tool, and based on the coefficients $C_{ijk}$, may determine a final value of the Hermite spline function ƒ(x,y,z) that is an approximation of a final value of the evaluation function g(x,y,z), e.g., for determining currents $I_{ds}$ and $I_{db}$ and/or a charge $Q_{db}$.

Advantageously, since the Hermite spline function ƒ(x,y,z) is determined based on vertex values of cuboids of the grid 400, the Hermite spline function ƒ(x,y,z) and its derivatives ∂ƒ/∂x, ∂ƒ/∂y, ∂ƒ/∂z are continuous in value across the vertices of the cuboids in the grid 400. In addition, the determination of the Hermite spline function ƒ(x,y,z) requires only known, local vertex values of predetermined cuboids in a grid of a table model. Accordingly, the table model tool may use a smaller grid for a table model, which results in the determination of the Hermite spline function ƒ(x,y,z) having less potential numerical problems like overshooting.

Figure 5:
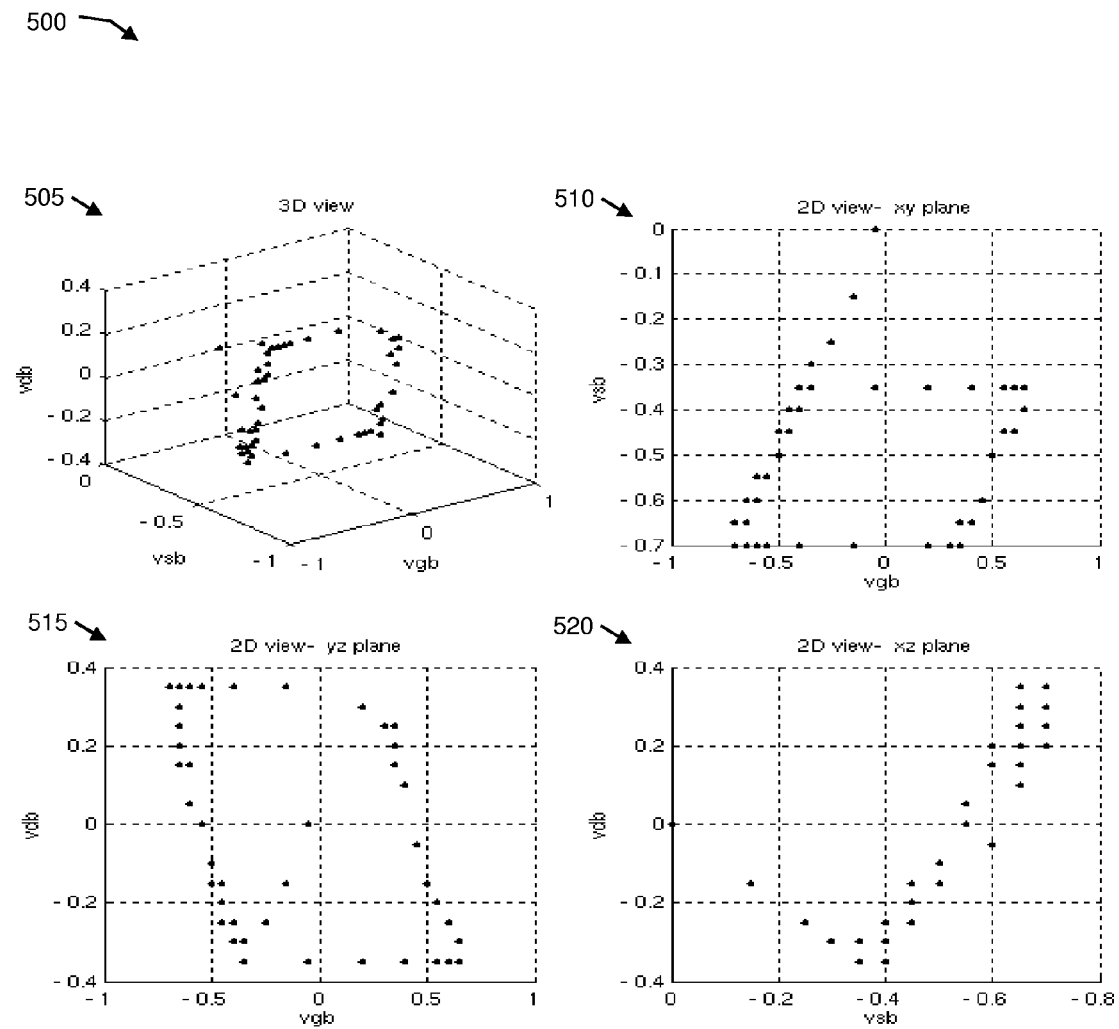
FIG. 5 are exemplary grids of voltages for which a table model of a n-type field effect transistor (nFET) in an inverter is provided and evaluated in accordance with aspects of the invention.

FIG. 5 are exemplary grids 500 of voltages for which a table model of a n-type field effect transistor (nFET) in an inverter is provided and evaluated in accordance with aspects of the invention. The grids 500 include a three-dimensional (3D) view 505 which includes a source-to-bulk voltage $v_{sb}$ axis, a gate-to-bulk voltage $v_{gb}$ axis, and a drain-to-bulk voltage $v_{db}$ axis. The 3D view 505 includes one or more previously-measured measurement points of the nFET in the inverter. For example, each of the measurement points may include a plurality of measurement values of the nFET in the inverter, such as voltages $v_{sb}$, $v_{gb}$, $v_{db}$ of the nFET. For each of the measurement points (e.g., ($v_{sb}$,$v_{gb}$,$v_{db}$)), the grids 500 may include a corresponding table entry which includes a plurality of generated evaluation values (e.g., coefficients, currents $I_{ds}$ and $I_{db}$, and/or a charge $Q_{db}$) of an evaluation function (e.g., a Hermite spline function) for the nFET of the inverter that may be retrieved for semiconductor device evaluation.

In embodiments, the grids 500 may further include two-dimensional (2D) views 510, 515, and 520. The 2D view 510 may include an x-y plane (e.g., the source-to-bulk voltage $v_{sb}$ axis and the gate-to-bulk voltage $v_{gb}$) and corresponding measurement points (e.g., ($v_{sb}$,$v_{gb}$)) in the x-y plane. The 2D view 515 may include an y-z plane (e.g., the drain-to-bulk voltage $v_{db}$ axis and the gate-to-bulk voltage $v_{gb}$) and corresponding measurement points (e.g., ($v_{db}$,$v_{gb}$)) in the y-z plane. The 2D view 520 may include an x-z plane (e.g., the drain-to-bulk voltage $v_{db}$ axis and the source-to-bulk voltage $v_{sb}$) and corresponding measurement points (e.g., ($v_{db}$,$v_{sb}$)) in the x-z plane.

Figure 6:
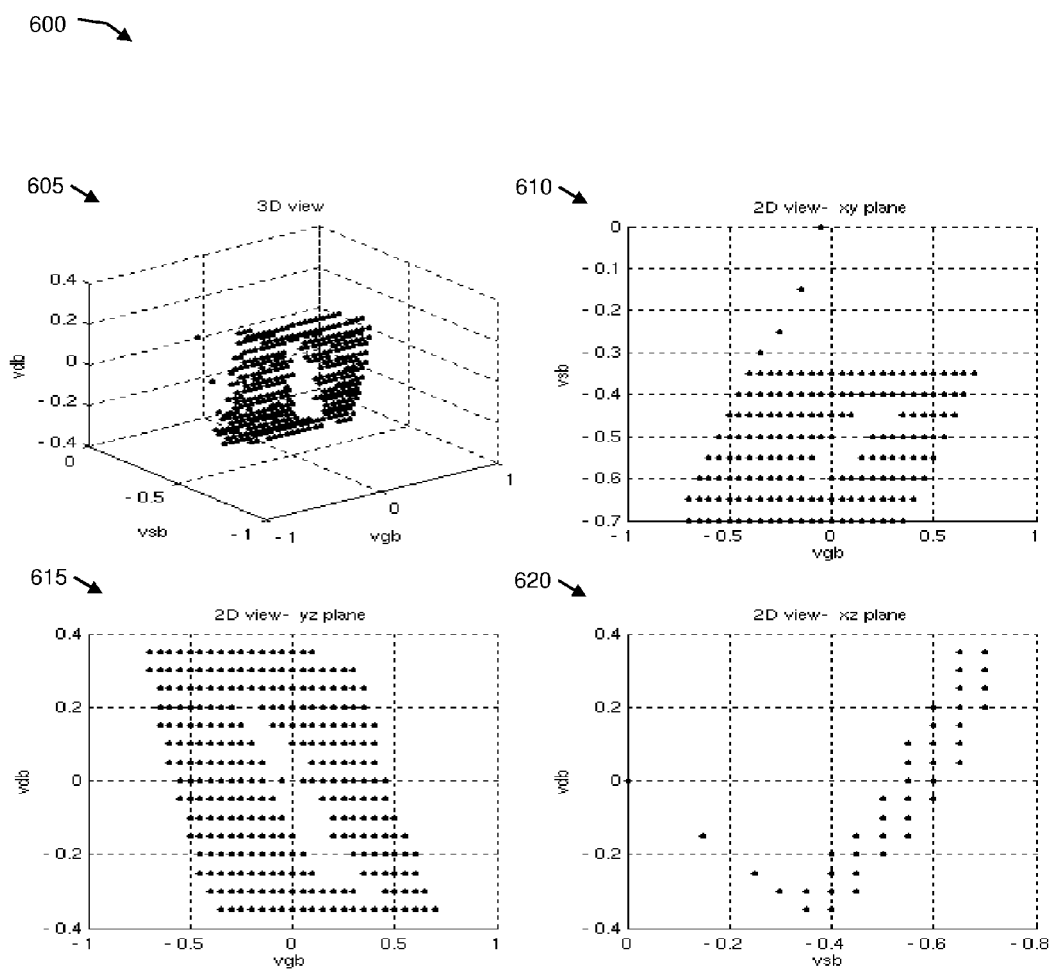
FIG. 6 are exemplary grids of voltages for which a table model of the nFET in a plurality of inverters is provided and evaluated in accordance with aspects of the invention.

FIG. 6 are exemplary grids 600 of voltages for which a table model of the nFET in a plurality of inverters is provided and evaluated in accordance with aspects of the invention The grids 600 include a three-dimensional (3D) view 605 which includes a source-to-bulk voltage $v_{sb}$ axis, a gate-to-bulk voltage $v_{gb}$ axis, and a drain-to-bulk voltage $v_{db}$ axis. The 3D view 605 includes one or more previously-measured measurement points of the nFET in the inverters. For example, each of the measurement points may include a plurality of measurement values of the nFET in the inverters, such as voltages $v_{sb}$, $v_{gb}$, $v_{db}$ of the nFET. For each of the measurement points (e.g., ($v_{sb}$,$v_{gb}$,$v_{db}$)), the grids 600 may include a corresponding table entry which includes a plurality of generated evaluation values (e.g., coefficients, currents $I_{ds}$ and $I_{db}$, and/or a charge $Q_{db}$) of an evaluation function (e.g., a Hermite spline function) for the nFET of the inverters that may be retrieved for semiconductor device evaluation.

In embodiments, the grids 600 may further include two-dimensional (2D) views 610, 615, and 620. The 2D view 610 may include an x-y plane (e.g., the source-to-bulk voltage $v_{sb}$ axis and the gate-to-bulk voltage $v_{gb}$) and corresponding measurement points (e.g., ($v_{sb},v_{gb}$)) in the x-y plane. The 2D view 615 may include an y-z plane (e.g., the drain-to-bulk voltage $v_{db}$ axis and the gate-to-bulk voltage $v_{gb}$) and corresponding measurement points (e.g., ($v_{db},v_{gb}$)) in the y-z plane. The 2D view 620 may include an x-z plane (e.g., the drain-to-bulk voltage $v_{db}$ axis and the source-to-bulk voltage $v_{sb}$) and corresponding measurement points (e.g., ($v_{db}$, $v_{sb}$)) in the x-z plane.

Figure 7:
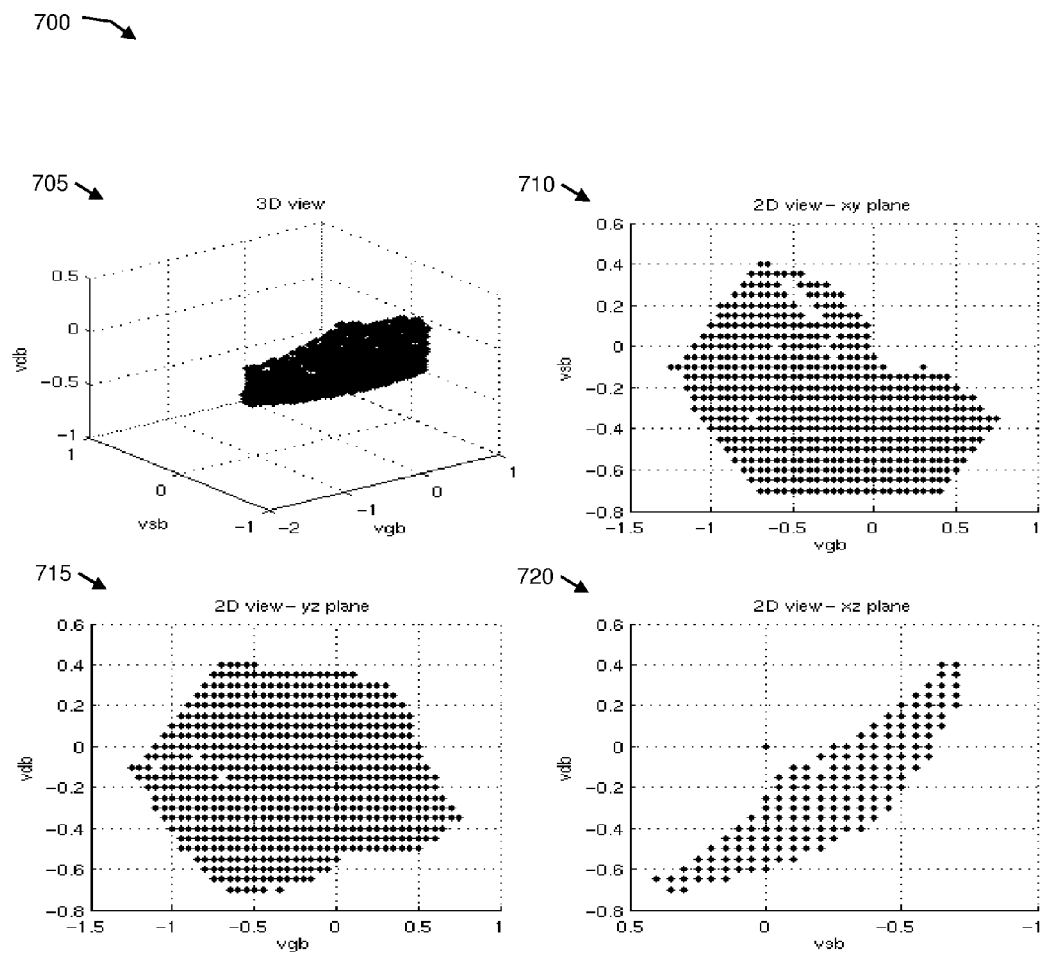
FIG. 7 are exemplary grids of voltages for which a table model of the nFET in a plurality of logic gates is provided and evaluated in accordance with aspects of the invention.

FIG. 7 are exemplary grids 700 of voltages for which a table model of the nFET in a plurality of logic gates is provided and evaluated in accordance with aspects of the invention. In embodiments, the logic gates may include inverters, NAND gates, multiplexers, XOR gates, AND-OR-Invert (AOI) gates, and other types of logic gates. The grids 700 include a three-dimensional (3D) view 705 which includes a source-to-bulk voltage $v_{sb}$ axis, a gate-to-bulk voltage $v_{gb}$ axis, and a drain-to-bulk voltage $v_{db}$ axis. The 3D view 705 includes one or more previously-measured measurement points of the nFET in the logic gates. For example, each of the measurement points may include a plurality of measurement values of the nFET in the logic gates, such as voltages $v_{sb}$, $v_{gb}$, $v_{db}$ of the nFET. For each of the measurement points (e.g., ($v_{sb}$, $v_{gb}$, $v_{db}$)), the grids 700 may include a corresponding table entry which includes a plurality of generated evaluation values (e.g., coefficients, currents $I_{ds}$ and $I_{db}$, and/or a charge $Q_{db}$) of an evaluation function (e.g., a Hermite spline function) for the nFET of the logic gates that may be retrieved for semiconductor device evaluation.

In embodiments, the grids 700 may further include two-dimensional (2D) views 710, 715, and 720. The 2D view 710 may include an x-y plane (e.g., the source-to-bulk voltage $v_{sb}$ axis and the gate-to-bulk voltage $v_{gb}$) and corresponding measurement points (e.g., ($v_{sb},v_{gb}$)) in the x-y plane. The 2D view 715 may include an y-z plane (e.g., the drain-to-bulk voltage $v_{db}$ axis and the gate-to-bulk voltage $v_{gb}$) and corresponding measurement points (e.g., ($v_{db},v_{gb}$)) in the y-z plane. The 2D view 720 may include an x-z plane (e.g., the drain-to-bulk voltage $v_{db}$ axis and the source-to-bulk voltage $v_{sb}$) and corresponding measurement points (e.g., ($v_{db},v_{sb}$)) in the x-z plane.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed:

1. A method of providing on-demand table models for semiconductor device evaluation, comprising:
    measuring one or more measurement values of an instance of a semiconductor device;
    providing, by a processor, a table model of the instance for the semiconductor device evaluation upon receiving a request for the semiconductor device evaluation; and
    generating a table entry in the table model for the one or more measurement values, the table entry comprising one or more evaluation values of an evaluation function for the instance,
    wherein:
        the one or more evaluation values comprise a plurality of coefficients of the evaluation function that are generated based on the one or more measurement values; and
        the plurality of coefficients are generated based solely on a plurality of vertices of a cuboid of the table model that the one or more measurement values lie within.

2. The method of claim 1, wherein the evaluation function comprises a Hermite spline function.

3. The method of claim 1, wherein the one or more measurement values comprise at least one of a source-to-bulk voltage, a gate-to-bulk voltage, and a drain-to-bulk voltage.

4. The method of claim 1, wherein the instance comprises a type of the semiconductor device that can be represented by at least one of a model name, a temperature, a corner name, a length, and a width, of the semiconductor device.

5. The method of claim 1, wherein the semiconductor device comprises at least one of a metal-oxide-semiconductor field-effect transistor (MOSFET) of a n-type or a p-type, a n-type field effect transistor (nFET), and a p-type field effect transistor (pFET).

6. The method of claim 1, wherein the providing of the table model comprises retrieving the table model assigned to the instance and comprising a multi-dimensional grid of one or more previously-measured measurement points of the instance.

7. The method of claim 1, wherein the providing of the table model comprises generating the table model comprising a multi-dimensional grid unpopulated with values.

8. The method of claim 1, wherein the providing the table model comprises:
    determining that an on-demand table model is assigned to the instance of the semiconductor, wherein the on-demand table model includes a multidimensional grid of previously-measured measurement points of the instance of the semiconductor device;

determining that a corresponding table entry exists for the one or more measurement values of the instance of the semiconductor device; and determining and evaluating resulting values of the evaluation function for the one or more measurement values to determine a quality of the instance of the semiconductor device.

9. A computer program product comprising a non-transitory tangible computer usable storage device or memory having readable program code embodied in the non-transitory tangible computer usable storage device or memory, the computer program product includes at least one component operable to:

measure one or more measurement values of an instance of a semiconductor device;

provide a table model of the instance for semiconductor device evaluation upon receiving a request for the semiconductor device evaluation; and generate a table entry in the table model for the one or more measurement values, the table entry comprising one or more evaluation values of an evaluation function for the instance, wherein:
the one or more evaluation values comprise a plurality of coefficients of the evaluation function that are generated based on the one or more measurement values; and the plurality of coefficients are generated based solely on a plurality of vertices of a cuboid of the table model that the one or more measurement values lie within.

10. The computer program product of claim 9, wherein the evaluation function comprises a Hermite spline function.

11. The computer program product of claim 9, wherein the one or more measurement values comprise at least one of a source-to-bulk voltage, a gate-to-bulk voltage, and a drain-to-bulk voltage.

12. The computer program product of claim 9, wherein the instance comprises a type of the semiconductor device that can be represented by at least one of a model name, a temperature, a corner name, a length, and a width, of the semiconductor device.

13. The computer program product of claim 9, wherein the semiconductor device comprises at least one of a metal-oxide-semiconductor field-effect transistor (MOSFET) of a n-type or a p-type, a n-type field effect transistor (nFET), and a p-type field effect transistor (pFET).

14. The computer program product of claim 9, wherein the providing of the table model comprises retrieving the table model assigned to the instance and comprising a multi-dimensional grid of one or more previously-measured measurement points of the instance.

15. The computer program product of claim 9, wherein the providing of the table model comprises generating the table model comprising a multi-dimensional grid unpopulated with values.

16. A method for semiconductor device evaluation, comprising:

measuring one or more measurement values of an instance of a semiconductor device;

at least one of retrieving and generating, by a processor, a table model of the instance for the semiconductor device evaluation upon receiving a request for the semiconductor device evaluation based on whether the table model is assigned to the instance; and generating a table entry in the table model for the one or more measurement values, the table entry comprising a plurality of coefficients of a Hermite spline function for the instance, wherein:
the plurality of coefficients are generated based solely on a plurality of vertices of a cuboid of interests of the table model and the plurality of measurement values that lie within the cuboid; and the at least one of retrieving and generating the table model of the instance comprises a multi-dimensional grid of one or more previously-measured measurement points of the instance.

17. The method of claim 16, wherein:
the one or more measurement values lie within a cuboid of the table model; and
the Hermite spline function $f(x,y,z)$ is represented by the following equation:

$$g(x, y, z) \sim f(x, y, z) = \sum_{i=0}^{i<4} \sum_{j=0}^{j<4} \sum_{k=0}^{k<4} C_{ijk} x^i y^j z^k,$$

wherein $g(x,y,z)$ is an evaluation function represented by the Hermite spline function, C represents the plurality of coefficients of the Hermite spline function, and i, j, and k are non-negative integers.

* * * * *